No. 781,539. PATENTED JAN. 31, 1905
G. A. MARSH.
MACHINE FOR MAKING HOLLOW GLASSWARE.
APPLICATION FILED FEB. 8, 1904.
2 SHEETS—SHEET 2.
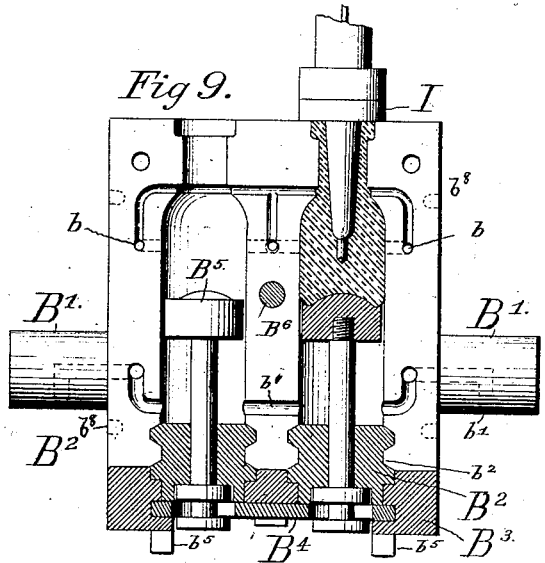
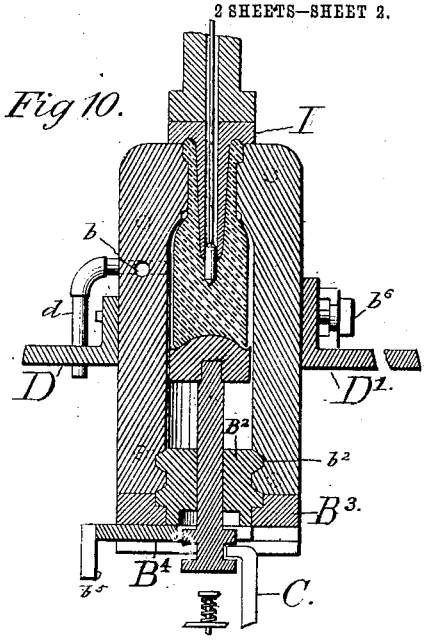
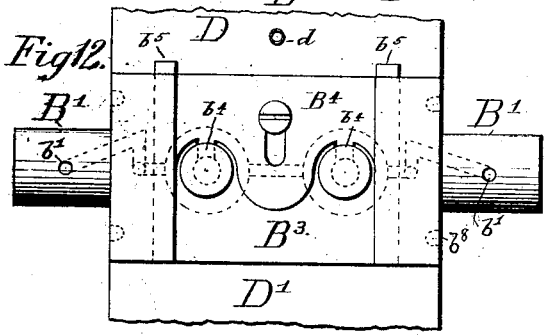
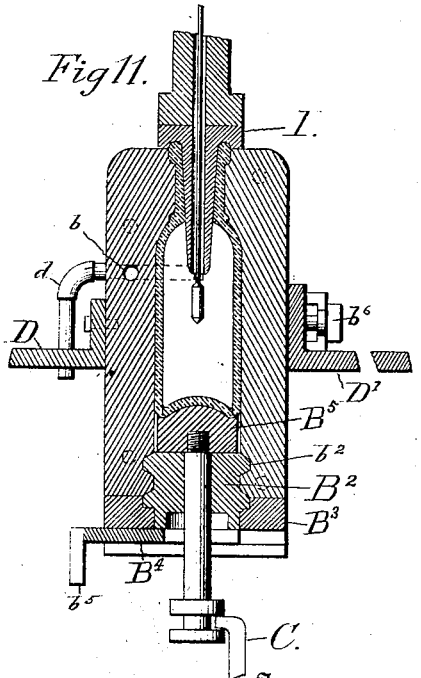
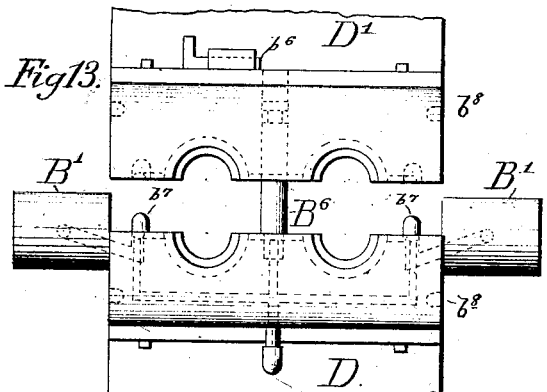

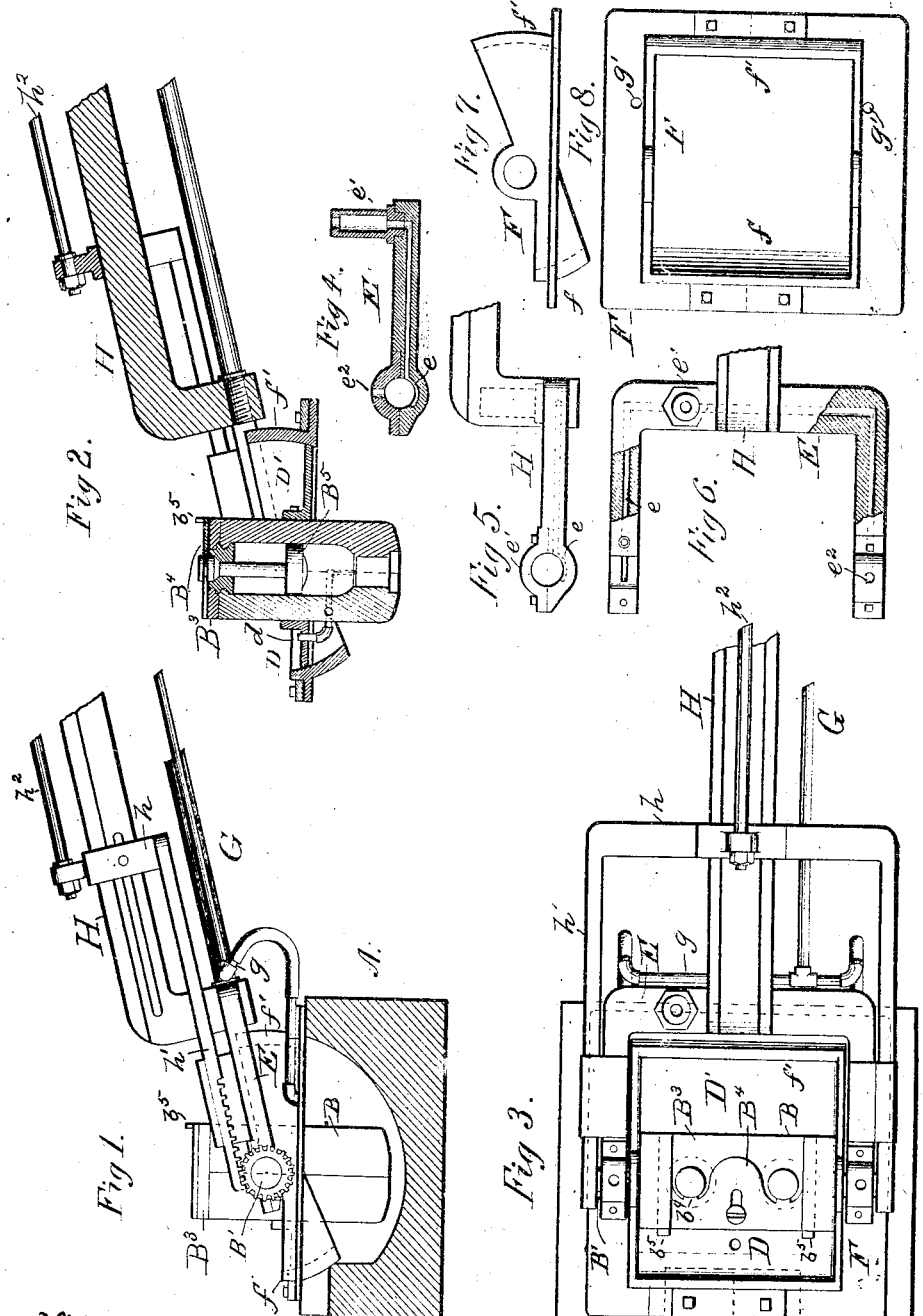

No. 781,539.

Patented January 31, 1905.

UNITED STATES PATENT OFFICE.

GEORGE A. MARSH, OF SANDUSKY, OHIO.

MACHINE FOR MAKING HOLLOW GLASSWARE.

SPECIFICATION forming part of Letters Patent No. 781,539, dated January 31, 1905.

Application filed February 8, 1904. Serial No. 192,596.

*To all whom it may concern:*

Be it known that I, GEORGE A. MARSH, a citizen of the United States, residing at Sandusky, in the county of Erie and State of Ohio, have invented new and useful Improvements in Machines for Making Hollow Glassware, of which the following is a specification.

My invention relates to improvements in machines for the manufacture of hollow glassware, and pertains to that type of machines in which a mold is charged with molten or plastic glass, the charge being pressed to form a part of the article, after which the charge is blown to its final shape.

The invention forming the subject-matter of this application provides means for charging the mold directly from a receptacle containing molten or plastic glass by means of air or fluid pressure in excess of that of the atmosphere, which forces a charge of molten glass from the receptacle into the mold, the charge being held in the mold and pressed to form a part of the article, the partly-shaped charge being subsequently blown to complete the article.

The invention also includes means for separating the partly-shaped charge from the mold prior to blowing.

The apparatus or machine comprises means whereby a mold having either a matrix or matrices is placed in and charged with molten glass taken into the mold from a receptacle, a sufficient quantity of molten glass being forced into the matrix or matrices of the mold from the receptacle by pressure exerted on the surface of the molten glass, such pressure being in excess of that of the atmosphere, and in mechanically pressing the charge to form a part of the article, after which the charge is partially separated from the mold by air-pressure on the exterior of a part of the charge, after which the article is blown to completion, as will be hereinafter set forth and claimed.

In carrying the invention forming the subject-matter of this application into use I employ a partible mold having a matrix or matrices, a closure for the receptacle from which the mold is charged, a support in the mold for the charge, air-ducts in the mold and its support for supplying air under compression to the receptacle and to the mold and to permit the air to escape from the mold. In the several steps employed in the manufacture of a hollow article of glass air under compression is used, and no attempt is made to handle or move the molten glass by rarefied air or a vacuum.

My invention, though adapted to the manufacture of many forms of hollow glassware, is particularly intended to be used in the manufacture of bottles, jars, and goods of a similar character.

In the accompanying drawings, which illustrate my invention, Figure 1 is a side elevation of the mold, the support for the mold, the closure for a receptacle for molten glass, the receptacle from which the mold is charged being shown in section. Fig. 2 is a sectional view of the mold, its support, and the cover or closure for the receptacle or tank for molten glass. Fig. 3 is a plan view of the parts shown by Fig. 1. Figs. 4, 5, and 6 are detail views of the mold-support. Figs. 7 and 8 are detail views of a part of the closure for the receptacle for the molten glass. Figs. 9, 10, and 11 are sectional views of the mold. Fig. 12 is an inverted plan view of the mold, and Fig. 13 is a plan view showing the mold-sections separated.

Referring to the drawings, A designates a receptacle for molten or plastic glass, the receptacle in practice being moved near or into a glass-furnace to receive its charge from the same, and its movement from the furnace is arrested, so the receptacle will be in a position to admit the mold being lowered therein, the receptacle being closed by a frame and wings carried by the mold.

The mold B is made up of two side sections having cavities to form the matrix or matrices, registering recesses $b$ to provide ventiducts, and air-passages $b'$, extending from the matrices of the mold and through the trunnions or bearings $B'$ of one of the side sections of the mold. The sections of the mold have recesses $b^2$, which retain, when the mold-sections are placed together, mold-bottoms $B^2$, said mold-bottoms being apertured for the passage therethrough of the stems of followers $B^3$, the heads on the stems being of less diameter than the diameter of the matrices. The bottom or plate $B^3$, to which the mold-bottoms are attached, is provided with a plate $B^4$, which is maintained in reciprocal engagement therewith, the plate having projections or lugs $b^4$ for engagement with the lower end of the follower $B^5$ to hold the same near the charging end of the matrix. The stems of the followers $B^5$ are provided with flanges so positioned as to provide a space in which the lugs $b^4$ may enter. The upper flange enters a recess in the outer portion of the mold-bottom $B^2$, and the aperture through the mold-bottom is of such size as to prevent other than a reciprocatory movement of the stem therein. The head of the follower is of slightly less diameter than the matrix and its upper face conforms to the shape of the bottom of the article which is formed in the matrix. The sliding plate $B^4$ has a slot for engagement with a screw or stop for limiting the sliding movement of the plate, and this plate is also provided with projections $b^5$ for operating the slide. The follower is engaged when the lugs are out of engagement with the recess, and the follower is partially lowered by an arm C, connected with suitable mechanism which actuates the arm to move the follower to its several positions. Between the matrices one of the mold-sections has attached a bar $B^6$, the end thereof being recessed, and the other section is apertured for the passage of a locking-bar and provided with a bolt $b^6$, which may be slid to engage the recess in the end of the bar $B^6$ and insure proper registration of the mold-sections when brought together. They are provided with dowels $b^7$ and recesses for said dowels, and exteriorly the mold may have a number of recesses $b^8$, with which the mechanism or means (not shown) for opening or closing the molds engage. Each section of the mold is provided with wings or plates D D', one of the plates being considerably longer than the other one, and these wings are bolted or otherwise secured to the sections of the mold. There is also present a pipe $d$, which extends from the air-passages $b$ of the mold through the plate D, the pipe opening to one side of the plate, the open end of the pipe extending toward the bottom of the mold. The trunnions have rigidly attached thereto near their outer ends gear-wheels which are engaged by rack-bars, said bars being reciprocated from a suitable machine.

E refers to a yoke having bearings or boxes for the trunnions B' of the mold, and the lower part of the boxes or bearings have air-passages $e$, which extend through the yoke and communicate with a nipple $e'$, and opposite the channels in the bearings there are vents $e^2$, such construction permitting the air-passages $b'$ through the trunnions and into the matrices of the mold to be placed in communication with the atmosphere or with an air-supply.

F refers to a frame which is carried by the trunnions of the mold and serves as a partial closure for the receptacle A. This frame has segmental portions $f\ f'$, the part $f$ being constructed to close the mouth or charging-recess of the receptacle A. The other segmental portion extends considerably upward above the horizontal flanges, and in practice the frame and wings carried by the mold-sections will form a complete closure for the receptacle for the molten glass when the mold and parts connected thereto are lowered in said receptacle.

G refers to a conduit or pipe having branch pipes $g$ with flexible sections which are connected by pipes with apertures $g'$ through the flanges of the frame F for the purpose of admitting to the receptacle when its top has been closed air under pressure to force molten glass from the receptacle into the matrix or matrices of the mold.

H refers to an arm or member of the machine which carries the mold and its attached parts, and to this arm is secured a cross-bar $h$, having parallel members $h'$ with teeth for engagement with the gear-wheels on the trunnions of the mold. The frame or yoke is reciprocated on the arm by a rod $h^2$, which is properly connected to operating mechanism.

The construction illustrated is designed particularly for the manufacture of bottles, and in connection therewith the blowing-machine has a nozzle I, which serves the double purpose of pressing the charge to form a part of the article and for blowing the article to its final shape, the nozzle being carried by the blowing-machine and connected with an air-supply, so that air under pressure will be admitted after the nozzle has pressed one end of the bottle or other article to shape.

In operation a receptacle, with its charge of molten glass, is moved from its source of supply to a point where the mold can be lowered therein, and when the mold is placed in the receptacle it is in an inverted position, so that its open end will be submerged, the wings and frame close the receptacle, and air under compression and in excess of the pressure of the atmosphere is admitted to the receptacle through the pipe G and its connections. The pressure on the surface of the molten glass forces the same into the matrix of the mold, and while the matrix is being charged the air-passages leading into the mold are open to the atmosphere. As soon as the mold is charged the reciprocating frame is moved, which turns the mold and brings its open end opposite the segmental portion $f'$ of the closure for the receptacle, which will sever any molten glass from the opening, and prior to the passage of the mold-opening toward the segmental portion $f'$ air will still act on the charge in the matrix. When the wings pass the segmental portions of the receptacle-closure, the receptacle is open to the atmosphere and the parts carried by or connected to the mold are lifted, the mold being turned from an inverted position, so that the charge contained in the matrix will rest upon the head of the follower. The arm H carries the mold to its proper position beneath the blowing mechanism. The nozzle is then forced into the charge, which shapes the lip and neck of the bottle by pressing. After the charge has been pressed by the insertion of the nozzle into the confined charge of plastic glass in the matrix the follower is lowered a short distance, as shown in Fig. 10, and air under pressure is admitted to the interior of the mold through the air-passages $e$ of the yoke and $b'$ through the trunnions and into the matrices above the mold-bottom, the air under pressure passing around or between the walls of the matrices, and the head of the followers separates the charge from the sides of the matrices, the air under pressure escaping through the venti-ducts $b$, the air on its escape compressing and obliterating the slight bead or projection formed on the glass by the recesses which form the air-passages. The admission of air between the mold and charge tends to cool both the mold and the charge, rendering the exterior of the charge somewhat harder by reason of being cooled than its interior. Immediately after the partially-shaped charge has had its unformed portion subjected to air under compression the follower is lowered to rest upon the mold-bottom $B^2$ and air is admitted through the nozzle to blow the article to completion, and after being blown the bolt $b^6$ is retracted and the molds are opened to permit said mold-bottoms and their connected parts being lowered with the article thereon.

It will be noted that with this device the mold is charged by air under compression exerted upon a mass of molten glass, and by using air under pressure there is no liability of leakage, as the supply may be considerably in excess of such leakage as may occur between the abutting parts. Air under compression tends to take up considerable of the heat given off from the molten glass, and the operation of forming bottles or hollow glassware can be carried on more rapidly than by the methods now in practice.

This application does not attempt to show the mechanism for handling the mold or operating and charging the receptacle, as such will form the subject-matter of other cases.

Having thus set forth my invention, what I claim as new, and desire to secure by Letters Patent, is—

1. In an apparatus for forming hollow glass articles, a mold, a receptacle for molten glass, a closure for the top of the receptacle of which the mold constitutes a part, means for charging the matrix of the mold by exerting on the surface of the glass pressure in excess of that of the atmosphere to force molten glass from the receptacle upward into the matrices of the mold and means for completing the article by blowing.

2. In the art of forming hollow articles from molten glass, a mold having a matrix in which the complete article is formed, a receptacle for molten glass, means for exerting pressure on the surface of the molten glass in the receptacle to force a charge of molten glass upward into the matrix of the mold, and means for completing the article in the matrix by blowing.

3. In glass-forming apparatus, a separable mold, a receptacle for molten glass, a closure for the top of the receptacle which includes as a part thereof the mold, and means for charging the mold by exerting on the molten glass in the receptacle pressure in excess of that of the atmosphere.

4. Glass-forming mechanism comprising a receptacle for molten glass, a mold, and a closure for the open upper end of the receptacle which includes as a part thereof the mold.

5. In the art of forming hollow glassware, a receptacle for molten glass, a mold, means for partially filling the mold from the receptacle, a plunger which is forced into the charge to partially shape the same, means for admitting air under-pressure between a part of the charge and the mold and means for blowing the partially-shaped charge to final shape.

6. Glass-forming mechanism comprising a receptacle for molten glass, a mold, a closure for the top of the receptacle which includes as a part of the same the mold, means for supplying to the space in the closed receptacle above the molten glass and surrounding the mold air under compression to force a charge of molten glass from the receptacle into the mold, means for forming a part of the article by mechanically pressing the charge, means for separating from the mold and cooling the partially-formed charge by air under compression, and means for blowing the charge to completion.

7. In the art of forming hollow articles of glass, a mold, means for charging the matrix thereof from a mass of molten glass in a receptacle by pressure on the surface of the glass in excess of that in the matrix when the open end of the mold is placed in the molten glass, and means for completing the article by blowing to final shape in the same matrix that the charge is gathered.

8. In the art of forming hollow glassware, a mold, a movable support therefor, a receptacle for molten glass, means for charging the mold by air-pressure greater than that of the atmosphere exerted upon the glass in the receptacle when the mold is partially submerged therein, means for raising the mold and turning the same and means for expanding the charge to final shape by blowing.

9. In the art of forming articles from molten glass, a mold, means for charging the mold, means for pressing the charge to shape, means for admitting air under pressure between a part of the charge and the mold after the charge has been pressed to form a part of the article and means for completing the shape of the article by blowing.

10. In the art of forming articles from molten glass, a mold, means for charging and partially shaping by pressing the charge in the mold and means for circulating air between the partially-shaped charge and the mold.

11. A mold for forming hollow glassware provided with an article-forming matrix, a follower movable in the matrix and adapted to sustain a charge of molten glass therein, and air-passages which enter the matrix on opposite sides of the head of the follower for the admission and escape of air under compression.

12. A mold having an article-forming cavity therein, a charge-sustaining head of less diameter than the cavity, an air-passage for the admission of air under compression to the cavity of the mold between the charge of molten glass and the walls of the cavity which passage leads into the mold on one side of the head and a passage on the other side of the head for the escape of air from the mold.

13. A mold for forming hollow glassware provided with a matrix in which the article is formed complete, means for charging the mold by filling a portion of the matrix with molten glass, means for partially shaping the charge by pressing, means for circulating air under pressure between that part of the charge which is blown to shape and the mold, and blowing means.

14. A mold having an article-forming cavity, means for charging the mold with molten glass and shaping by pressure a part of the article in the mold, and means for subjecting the exterior of that part of the charge which is subsequently expanded by blowing to a current of air.

15. A mold for forming hollow articles of glass, comprising separable sections, a disk-shaped mold-bottom which is engaged by the sections, a movable bottom for the matrix, passages for the admission and exit of air in communication with the matrix on opposite sides of the matrix-bottom, for the purpose of circulating air between a part of the exterior of the molten glass from which the article is formed and the walls of the matrix.

16. In the art of forming hollow articles directly from molten glass, a mold, a support with which the mold is maintained in swinging engagement, a receptacle for molten glass, a closure for the top of the receptacle which includes the mold, an air-supply for charging the space in the receptacle with air under compression, means for turning the mold upon its support, and means for shaping the charge in the mold.

17. In the art of forming hollow articles directly from molten glass, a mold, a receptacle for molten glass, means for producing on the molten glass in the receptacle pressure in excess of the pressure of the atmosphere to charge the mold by forcing molten glass upward into the mold when the open end of the mold is submerged therein, and air-passages from the interior of the mold to the atmosphere.

18. A receptacle for molten glass, a mold, a closure for the receptacle which includes as a part thereof the mold, a mold-support and means for turning the mold upon its support independent of the other part of the closure.

19. A longitudinally-partible mold one of the side sections thereof having journals, means for holding the sections in engagement, air-passages through the journals which enter near one end of the matrix of the mold and air-passages near the opposite end of the matrix, substantially as shown.

20. In the art of making hollow glassware, a longitudinally-separable mold in which the complete article is formed, means for charging the mold with molten glass, a follower for holding the charge in the mold, a plunger-nozzle for pressing the charge to partial shape, means for releasing the follower, passages for admitting air under pressure between the partially-shaped charge and the wall of the matrix of the mold and means for blowing the article to completion in the mold.

21. Glass-forming mechanism comprising a receptacle for molten glass having an open top, a mold, a closure for the receptacle which includes as a part thereof an open-ended mold, means for charging the mold by pressure upon the surface of the molten glass in the receptacle and surrounding the mold and means for shaping the charge to completion within the mold.

22. In the art of forming hollow articles of glass, a separable mold, a receptacle for molten glass, a closure for the open end of the receptacle which includes as a part thereof the mold, means for admitting air under compression upon the surface of the molten glass when the mold is partially submerged therein to charge the matrix of the mold, a follower within the matrix and means for shaping the charge to final shape in the same matrix that the charge is gathered.

23. In the art of forming hollow articles from molten glass, a mold in which the complete article is formed, means for charging the mold with molten glass, means for pressing the charge to form a part of the article, means for admitting air under pressure between a part of the partially-shaped charge and a part of the mold, and means for completing the article by blowing.

24. In the art of forming hollow glassware, a separable mold, a movable bottom or follower therefor, means for gathering a predetermined quantity of molten glass in the mold between its open end and the follower, a plunger-nozzle for pressing the charge to partial shape, means for releasing the follower after the charge has been pressed and means for expanding the glass in the mold in which it is gathered to complete shape.

25. In an apparatus for manufacturing hollow glassware, a receptacle for molten glass, a mold having therein a movable member for changing the capacity thereof and holding the charge which is received therein, a plunger-nozzle for pressing the mold-contained charge to partial shape, means for releasing the movable member of the mold and then blowing the charge to final shape.

26. In an apparatus for manufacturing hollow glassware, a separable gathering-mold which is divisable longitudinally and provided at one end with a contracted opening, means for charging the closed mold with molten glass through the contracted opening, means for holding the charge in the mold adjacent to its open and contracted end, a plunger insertible into the charge in the mold to partially shape the article, means for releasing the partially-shaped charge and blowing the same to final shape.

27. In an apparatus for manufacturing hollow glassware, a unitary gathering and shaping mold provided with a matrix having a contracted opening at one end, means for partially filling the matrix of the mold through its contracted end with molten glass, means for primarily pressing the charge against the walls of the matrix adjacent to its open end and then blowing the charge beyond the pressing means to final shape.

28. In an apparatus for manufacturing hollow glassware, a unitary gathering and shaping mold which is separable longitudinally and provided with a matrix having a contracted end through which the mold is charged and which conforms to the external shape of a part of the article, means for charging the mold through its contracted open end with molten glass, means for pressing the charge while in the matrix to form a part of the article and blowing the charge after pressing to final shape.

29. In an apparatus for manufacturing hollow glassware, a separable gathering and shaping mold having a matrix with a contracted open end, means movable within the matrix to divide the same and provide means for limiting the quantity of the charge, means for charging the matrix through its open end with molten glass, a plunger insertible into the charge to press the charge while confined near the open end of the matrix and means for expanding a portion of the charge by blowing to complete the article.

In testimony whereof I have signed my name to this specification in the presence of two subscribing witnesses.

GEORGE A. MARSH.

Witnesses:
FRANK S. APPLEMAN,
EUGENE W. JOHNSON.